United States Patent [19]  
Lindsey

[11] 3,999,713  
[45] Dec. 28, 1976

[54] NEBULIZATION-HUMIDIFICATION NOZZLE
[75] Inventor: Joseph W. Lindsey, Salt Lake City, Utah
[73] Assignee: Arbrook, Inc., Arlington, Tex.
[22] Filed: July 16, 1975
[21] Appl. No.: 596,479
[52] U.S. Cl. .............................. 239/426; 239/338; 239/596; 239/600
[51] Int. Cl.² ......................................... B05B 7/28
[58] Field of Search .......... 239/338, 318, 426, 433, 239/434, 337, 596, 600

[56] References Cited
UNITED STATES PATENTS

| 646,491 | 4/1900 | Dunlap | 239/338 |
|---|---|---|---|
| 2,518,709 | 8/1950 | Mosby, Jr. | 239/318 X |
| 3,563,471 | 2/1971 | Watkin | 239/451 |

FOREIGN PATENTS OR APPLICATIONS 248,894  7/1912  Germany ........................... 239/338

Primary Examiner—John J. Love  
Attorney, Agent, or Firm—John J. Simkanich

[57] ABSTRACT

A nozzle formed by the mating of two separable parts, a housing and a plug insert, having a smaller diameter orifice formed at a first mating interface of these two parts, a Venturi chamber connected to the smaller orifice, being formed at a second mating interface of these two parts and a larger diameter orifice extending through the plug insert part being connected to the Venturi chamber.

14 Claims, 4 Drawing Figures

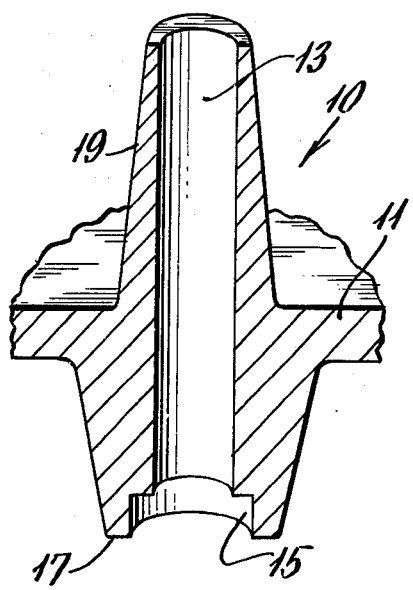
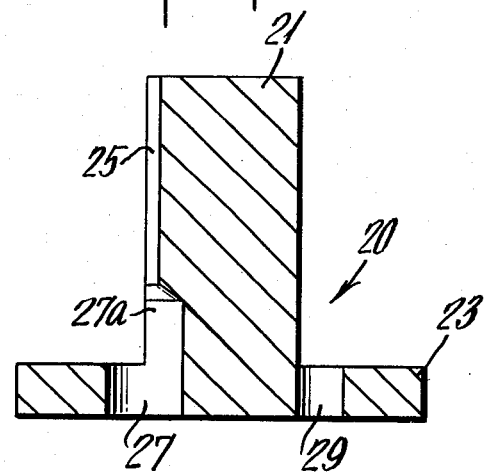
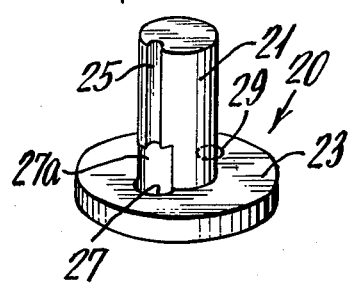
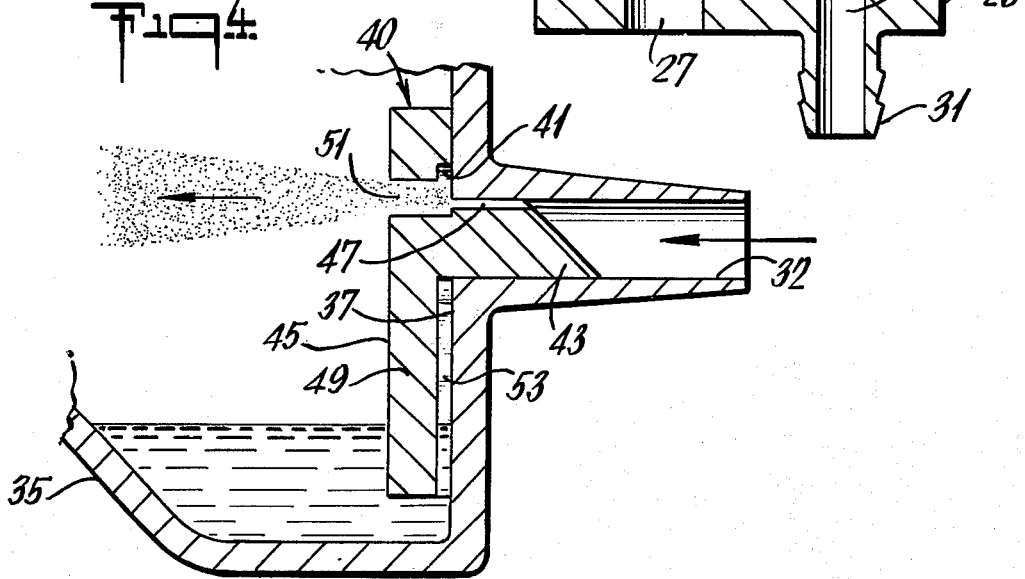

NEBULIZATION-HUMIDIFICATION NOZZLE

BACKGROUND OF THE INVENTION

Nozzles used in humidifier and nebulizer atomizers are often of the Venturi type. These Venturi nozzles usually have a small orifice through which a gas is forced to cause its expansion. The expanding gas jet is directed through, or over, a Venturi chamber containing a fluid whereby an effected vacuum draws droplets into the gas stream. This mixture is usually passed through a second or larger orifice permitting a secondary expansion during which droplet groupings tend to disassociate. The aerosol mixture may then be impinged upon a baffle to further reduce the size of droplets in suspension before being passed out of the device.

Three components, and their associated dimensions, are essential to the design of these nozzles. These components include a smaller or jet orifice, with its jet diameter; a larger or aerosol orifice, with its aerosol diameter; and a Venturi chamber, with its spacing between the jet and aerosol orifices. Additionally, it is critical that the centerline of the aerosol orifice be aligned with the centerline of the jet orifice in an assembled nozzle. Any deviation from specification greatly affects nozzle performance.

The manufacture of high quality, nebulization nozzles (those capable of producing a mist in the 1 to 10 micron size) therefore becomes quite costly with quality control expenses becoming a significant part of overall nozzle costs. These expenses have hampered the development of disposable nozzles.

A principal problem in making these nozzles out of materials acceptable for medical application, such as molded plastic materials, arises in the molding of the interior cavity. This cavity is usually formed with a long pin, used as the die, which is frequently about one-eighth inch in diameter. The pin has a stepped-down portion which is used to form the jet orifice. This thin stepped-down portion is usually driven into the molding material intended to form the housing of the nozzle. The material is penetrated to its full depth, or alternatively, through its full depth and beyond. During this operation the pin often bends slightly and wears a side of the formed hole. Sometimes the pin breaks off in the hole. In many instances, therefore, an irregular hole results from the manufacturing process. Moreover, as a result of this process "molding flash" is often generated which extends into intended passageways. When the pin penetration is only to full depth, a "skin" is often left over the end of the molded hole. In addition, the thin stepped-down end of the pin has a tendency to move off of center during the molding process thus producing a misalignment of jet orifice to aerosol orifice in an assembled nozzle.

These molding process defects contribute to high rejection rates, increase mold costs, increase mold maintenance costs, and increase quality control costs.

What is desired, therefore, is a method of manufacturing these nozzles in which the enumerated problems and defects are eliminated or reduced so that the nozzle produced is economical enough to be disposable.

An object of this invention is to provide a method of manufacturing Venturi type nebulization nozzles wherein molding skin and flash defects are reduced.

Another object of this invention is to provide a method of manufacturing said nozzles wherein misalignment of orifices defects are reduced.

A further object of this invention is to provide an nebulization nozzle which is economically disposable.

Another object of this invention is to provide a disposable nozzle having a reduced number of parts.

Another object of this invention is to provide a disposable nozzle having essential functions defined at the interfaces of two mating parts.

An even further object of this invention is to provide a disposable nozzle wherein the essential functions defined at mating part interfaces are defined by mating part interfaces.

SUMMARY OF THE INVENTION

The objectives of this invention may be achieved by the manufacturing of an nebulization nozzle in two separable parts wherein a nozzle may be created by the mating of the two components, a housing and a plug insert. Nozzle functions may be established at, and by, interfacing surfaces. The components may be injection molded of thermoplastic materials.

The housing is preferably molded with a passageway therethrough having an annular-like groove or undercut in the designated exit end of this passageway.

The plug insert is preferably molded having a mushroom-like shape with a narrower stem portion and a wider head portion. Preferably, a longitudinal channel runs the length of the stem portion. A first passageway may extend through the head portion in alignment with the centerline of the stem channel, while a second hole may extend through the head for providing access to the passageway's annular groove when the plug is inserted into the housing.

A nozzle may be assembled by inserting the stem portion of the plug insert into the housing passageway at the groove end until the head portion of the plug abuts the housing exit end. With the components mated within close tolerances, a jet orifice may exist at the passageway-stem interface, with the longitudinal channel and passageway inner wall defining the size and shape of the jet orifice. The head portion through passageway having been molded into the plug insert part in alignment with the stem channel may form an aerosol orifice which is in alignment with the formed jet orifice. A Venturi chamber may be formed at the passageway annular groove and plug head interface, with the groove width defining the spacing from jet orifice to aerosol orifice.

DESCRIPTION OF THE DRAWINGS

The novel features of this invention, as well as the invention itself, both as to its organization and method of construction, will best be understood from the following description taken in connection with the accompanying drawings in which like characters refer to like parts, and in which:

FIG. 1 is a cross-sectional view of the housing component of the nozzle;

FIG. 2 a and b shows a perspective view and a cross-sectional view, respectively, of the plug insert component;

FIG. 3 shows a cross-section of an assembled nozzle with an alternate embodiment of the plug insert;

FIG. 4 shows a cross-section of an alternate embodiment of the nozzle in a nebulizer apparatus.

DETAILED DESCRIPTION OF THE INVENTION

A disposable nebulizer nozzle of the kind used in medical humidifiers and nebulizers needs to be inexpensive. This factor necessitates that manufacturing costs and material costs be low. A simple design with a minimum number of parts contributes to lowering these factors. A simplified manufacturing process also helps.

The following essential ingredients contribute to a Venturi-type nebulization nozzle, which is commonly employed in medical applications; a small diameter air jet being formed by air forced through a small orifice, a passing of the air jet through or by a fluid containing Venturi chamber, and the exiting the air stream through a larger orifice. As the air passes the fluid, most likely water, an ejector action is created establishing the Venturi chamber's operations and droplets of the fluid are drawn into the air jet by the vacuum. The air jet carries the suspended droplets through the larger orifice as a mist. Nozzle performance characteristics are therefore determined by the small or jet orifice size, the larger or aerosol orifice size, the distance between orifices, and the air jet velocity.

For a given nozzle specification, various product defects can be created during a typical manufacturing process, such as the injection molding of thermoplastic material as is commonly employed for medical apparatus. These defects can alter nozzle operating characteristics sufficiently to produce a defective or rejectable nozzle. Typical defects include skin and flash in and around the jet and aerosol orifices, misalignment of the jet and aerosol orifices and distortion in jet and aerosol orifice walls.

A nozzle design and a molding process wherein the cavities to be formed are at or close to outer surfaces or are of simple and "straight-through" configuration tends to greatly reduced rejectable products. Moreover, when the dies employed can be designed of sufficient size and strength or can have sufficient support, a better manufactured product will result.

FIGS. 1 and 2 show the components of a simplified nozzle having only two parts, a housing 10 and an insertable plug 20.

The housing 10 is shown in cross-section in FIG. 1. This housing 10 may be formed from a mass of molded plastic such as polyethylene or polypropylene to have a support member 11. A passageway 13, which may have any one of a plurality of acceptable shapes, extends completely through the support member 11. Preferably, the passageway 13 is cylindrical in shape with a circular cross-section. At one end of the passageway 13, designated the exit end, a groove or undercut 15 extends annularly about the passageway 13 wall. As with the passageway 13, the groove 15 may have any of a number of shapes. It is convenient, however, that groove 15 be cylindrically shaped and extend inwardly from the exit edge of housing 10 to a designated design depth so as to extend annularly about the passageway 13.

The exit wall 17 of the housing 10 extends perpendicularly, in a flat plane, to the passageway 13; and is large enough to provide an air and fluid seal when mated with a surface of the plug insert 20.

The entrance wall of the housing 10, i.e., opposite the designated exit, may be provided with a protruding tapered fitting 19 or the like to which an air supply may be fitted.

The plug insert 20, FIGS. 2 *a* and *b*, includes a stem portion 21 and a head portion 23. Since the plug insert 20 mates with the passageway 13 its shape is governed by that of the passageway 13. For a cylindrical housing passageway 13, the plug insert 20 is mushroom-shaped, having a cylindrically-shaped stem 21 and a wider, cylindrically-shaped head 23.

Extending longitudinally along the surface of the stem 23 is a channel 25. The channel 25 may have a number of cross-sectional shapes including semicircular, vee-shaped or even be a cordal-section formed by a flat along the stem 21. However, since the shape of the channel 25 contributes to the shape of the jet orifice in an assembled nozzle, the cross-section of this channel will effect nozzle performance. The channel 25, preferably, has a semicircular cross-section.

Extending through the head 23 of the plug insert 20, and beyond, in alignment with the centerline of the channel 25, is a circular passageway 27. The passageway 27 extends along the stem 21 beyond the head 23 a distance equal to the extension of the annular groove 15, from the exit wall of housing 11 along the housing passageway 13. This extension of the passageway 27, beyond the plug head 23, carves out an enlarged semicircular-like cavity 27 along the stem 21 which meets the channel 25. The diameter of this passageway 27 greatly exceeds the cross-sectional dimensions of the stem groove 25.

Positioned away from the head 23 through passageway 27 is a second passageway or hole 29. The hole 29 may be circular, or of any other convenient cross-sectional shape; and extends into a tangential plane to the circumference of the stem 21. Preferably the hole 29 is positioned 180 degrees about the stem 21 from the passageway 27. While this hole 29, alternately, may be canted, its inner end should remain positioned tangent to the stem 21 surface.

The housing 10 may therefore be easily injection molded with a cylindrical pin-shaped die to produce a product with a minimum of manufacturing defects. This pin may have an outer diameter equal to the diameter of the passageway 13 with a built-up shoulder to form the groove 15. In that the diameter of the passageway 13 and the diameter across the annular groove 15 are not critical, a practical size may be chosen for these dimensions which allows for a substantial pin (die) while maintaining the size of the housing 10 within a reasonable range. Under these conditions the molding defects discussed above are greatly reduced.

Moreover, the substantial size of this pin (die) allows for a careful machining of the length of the built-up shoulder which forms the critical Venturi spacing.

The plug insert 20 may be injection molded having the stem channel 25 formed by a machined key on the inner surface of the mold. The hole 29 which is used to feed fluid to the annular groove 15 and therein to the Venturi chamber may be formed by a pin member of reasonable size. The alignment of this hole 29 in a tangent plane to the circumference of the stem 21 or the canting of this hole 29 out of the plane while maintaining in inner end of the hole tangent to the stem 21 surface is essential, the exact size of the hole 29 and rotated position about the stem 21 is not.

The aerosol orifice or head passageway 27 needs to be formed to exact dimensions of diameter and depth and positional alignment. The dimensions of a pin which forms this passageway 27 must be precise. In that the aerosol orifice is of considerable size, relative to the jet orifice, the passageway 27 can be formed with a pin sturdy enough to produce an acceptably manufactured passageway 27. These manufacturing conditions contribute to a product having a greatly reduced incidence of manufacturing defects.

An assembled nozzle is shown in FIG. 3 in cross-section about the exit end of the housing 10. With the plug 20 inserted into the exit end of the housing 10, i.e., the stem portion 21 being inserted to fullest depth until the head 23 buts against the exit wall 17, essential functional components are formed at, and by, interfacing surfaces which mate within close tolerances. The jet orifice is formed at, and by, the mating interface of the housing passageway 13 and the stem channel 25. The Venturi chamber is formed at, and by, the mating interface of the housing annular groove 15, the head 23 inner or housing-facing surface and the passageway 27. The passageway 27 through the head 23 creates an aerosol orifice.

In the embodiment as shown in FIG. 3 the stem portion has been truncated to reduce the length of the channel 25. Also, the center of the stem 21 has been hollowed to permit a savings in material. Additionally, the hole 29 has been fitted with a connection fitting 31 for connecting to a water supply.

In operation, air is forced through the nozzle's jet orifice from the entrance end of the housing 10; through the Venturi chamber, which has been supplied water via the fitting 31, the hole 29 and the annular groove 15, to extract droplets of water and to propel them through the aerosol orifice 27 to create an output mist.

An alternate embodiment of the nozzle is shown in FIG. 4. In this alternate embodiment, housing 30 contains a cylindrically-shaped passageway 31 and a tapered fitting 33 for inlet air in similar configuration to that of the previously described housing 10. However, in this embodiment the annular groove, which provides the Venturi chamber spacing, does not exist as part of the housing 30. Venturi chamber spacing is provided by an annular groove in a plug insert 40 and will be further discussed below. Formed as part of the housing 30 is a water reservoir 35 which is positioned below and away from the passageway or housing exit wall 37. This water reservoir 35 is formed by a continuation of this housing exit wall 37, the housing passageway 31 being in a horizontal position, downwardly and then outwardly in a flaired or cup fashion.

In this alternate embodiment a plug insert 40, again, has a mushroom-like configuration with a cylindrically-shaped stem portion 43 having a truncated end and a cylindrically-shaped head portion 45 extending beyond the stem 43. A semicircular channel 47 again extends longitudinally along the stem 43. The plug 40 has the head portion 45 with an elongate extention 49 on one side. This extension 49 is intended to extend downwardly into the water reservoir 35 when the plug 40 is inserted into the housing 30.

Extending through the head 45 in alignment with the channel 47 is a circular passageway 51. As in other embodiments, the function of this passageway 51 is to form the aerosol orifice of the nozzle.

Spaced about the head in a plane perpendicular to the stem 43 so as to connect to the channel 45 and the circular passageway 51 is a groove 41. This groove 41 provides the Venturi chamber spacing and connects to a water passageway 53 formed between the head extension 49 and the housing exit wall 37 when the plug 40 is fully inserted into the housing. As with other embodiments, the insertion of the plug 40 into the housing 30 creates the jet orifice and the Venturi chamber.

Many changes could be made in this invention without departing from the scope thereof. All matter contained in the above designation or shown in the accompanying drawings is therefore to be interpreted as illustrative and not to be taken in the limiting sense.

What is claimed:

1. A nozzle having a plurality of parts creating a jet orifice, an aerosol orifice and a Venturi chamber connected therebetween, comprising:
   means for creating the jet orifice at a first mating interface of said parts;
   means for creating the Venturi chamber at a second mating interface of said parts, said Venturi chamber being so created connected to said jet orifice; and
   means for establishing a Venturi chamber supply passageway at a third mating interface of said parts, said supply passageway being connected to said Venturi chamber.

2. The apparatus of claim 1 wherein:
   said jet orifice creating means accomplishes said creation by a first interfacing of parts;
   said Venturi chamber creating means accomplishes said creation by a second interfacing of parts; and
   said supply passageway establishing means accomplishes said establishment by a third interfacing of parts.

3. The apparatus of claim 2 wherein said plurality of parts includes:
   a housing; and
   a plug insertable therein.

4. The apparatus of claim 3 wherein said housing includes:
   a passageway; and
   an annular groove extending about said passageway at one end thereof.

5. The apparatus of claim 4 wherein said plug includes a stem portion and a head portion connected thereto, said stem being insertable into said housing passageway, said head butting against the passageway housing wall when said stem is fully inserted to seal the end of the housing passageway.

6. The apparatus of claim 5 wherein said stem portion includes:
   a longitudinal channel in the surface thereof; and
   a cavity extending along said stem in alignment with said channel, said cavity's extension meeting said channel and the jointure of said stem and said head portions.

7. The apparatus of claim 6 wherein said head portion includes a first passageway extending therethrough, said passageway being in alignment with said stem channel and said stem cavity.

8. The apparatus of claim 7 wherein said head portion includes a second passageway therethrough, being positioned a distance away from said first passageway and having an inner end tangent to said stem surface.

9. The apparatus of claim 8 wherein said housing passageway, said plug head first and second passageways have circular cross-sections; wherein said stem channel and said stem cavity have semicircular cross-sections; and wherein said housing annular groove is cylindrically-shaped.

10. A nozzle having plural parts, comprising:
    a housing containing a passageway therethrough; and
    a plug being insertable into said passageway, creating at interfacing surfaces therebetween a jet orifice, a Venturi chamber in alignment with said jet orifice and a supply passageway connected to said Venturi chamber, said plug also including an aerosol orifice therethrough in alignment with said jet orifice and said Venturi chamber created.

11. The nozzle of claim 10 wherein said passageway includes a larger cross-section at one end thereof and wherein said plug is insertable at said passageway larger end.

12. The nozzle of claim 11 wherein said plug includes:
a stem portion, having a channel extending along the surface thereof and being insertable into said housing passageway larger end; and
a head portion being larger in cross-section than said stem and sealing the end of said passageway when said stem portion is fully inserted therein, said head portion having a first passageway in alignment with said stem channel and a second passageway, spaced away from said first passageway, said stem portion also including a cavity connecting said stem portion channel and said head portion first passageway.

13. The nozzle of claim 12 wherein said housing passageway larger cross-sectional end includes an annular groove.

14. The nozzle of claim 10 wherein said housing includes a reservoir external to said passageway; and wherein said plug includes a stem portion having a channel extending along the surface thereof and being insertable into said housing passageway, and a head portion being larger in cross-section than said stem and sealing the end of said passageway on one side thereof, the other side of said head being elongate to extend along the outer face of said housing to proximity of said reservoir to form a passageway from said reservoir, said head portion also including a passageway therethrough in alignment with said stem portion channel and a groove creating a chamber between said through passageway and said stem portion channel, said groove being connected to the passageway formed from said reservoir by said housing and said head portion elongated extension.

* * * * *